(No Model.) 8 Sheets—Sheet 2.

G. W. HALL.
TYPE WRITING MACHINE.

No. 581,717. Patented May 4, 1897.

Witnesses:
E. D. Smith
N. W. Harrison

Inventor:
Geo. W. Hall
by Henry Calver
Atty.

(No Model.)  8 Sheets—Sheet 3.

G. W. HALL.
TYPE WRITING MACHINE.

No. 581,717.  Patented May 4, 1897.

Witnesses.
E. D. Smith
N. W. Harrison

Inventor.
Geo. W. Hall
by Henry Calver
Atty.

THE NORRIS PETERS CO., PHOTO-LITHO., WASHINGTON, D. C.

(No Model.) 8 Sheets—Sheet 4.
G. W. HALL.
TYPE WRITING MACHINE.

No. 581,717. Patented May 4, 1897.

Witnesses: Inventor:

(No Model.) 8 Sheets—Sheet 5.
G. W. HALL.
TYPE WRITING MACHINE.

No. 581,717. Patented May 4, 1897.

Witnesses
E. D. Smith
H. I. Curry

Inventor
Geo. W. Hall
by Henry Calver
Atty.

(No Model.) 8 Sheets—Sheet 8.

G. W. HALL.
TYPE WRITING MACHINE.

No. 581,717. Patented May 4, 1897.

Witnesses: E. B. Smith, W. W. Harrison

Inventor: Geo. W. Hall

United States Patent Office.

GEORGE W. HALL, OF HERMON, MAINE.

TYPE-WRITING MACHINE.

SPECIFICATION forming part of Letters Patent No. 581,717, dated May 4, 1897.

Application filed June 28, 1888. Serial No. 278,413. (No model.)

*To all whom it may concern:*

Be it known that I, GEORGE W. HALL, a citizen of the United States, residing at Hermon, in the county of Penobscot and State of Maine, have invented certain new and useful Improvements in Type-Writing Machines, of which the following is a specification, reference being had therein to the accompanying drawings.

The object of my invention is to provide a type-writer capable of rapid operation and embracing many convenient and desirable features, my present invention being in some respects an improvement on the machine embraced by my Patent No. 364,343, dated June 7, 1887.

In the drawings, Fig. 6ª is a sectional detail showing the clutch in operative connection with the feed-wheel.

A denotes the frame of the machine, at the rear end of which is a small upright bracket or frame $a$, supporting the rod $b$, on which are pivoted the lower or transverse operating-levers B and B'. At the right-hand end of the frame A is a depending bracket or frame $a'$, supporting the rod $c$, on which are pivoted the longitudinal operating-levers C. These operating-levers are all depressed by vertically-movable keys $d$, having operating-buttons D at their tops and provided with wings or projections $d'$ to engage the said levers, the latter and the said keys being lifted by the spiral springs $a^2$, attached to the outer ends of the said levers and to the lower parts of the frames or brackets $a$ and $a'$. The upward movements of the keys may be assisted by the springs $d^2$ at the bottom thereof. The keys $d$ pass through holes in transverse and longitudinal bars $d^3$ and $d^4$, the former being at the bottom of the frame A and the latter at the top thereof, the said bars $d^4$ being supported by the inclined bars $a^3$, resting at their rear ends on the posts $a^4$.

Figures 12, 15:
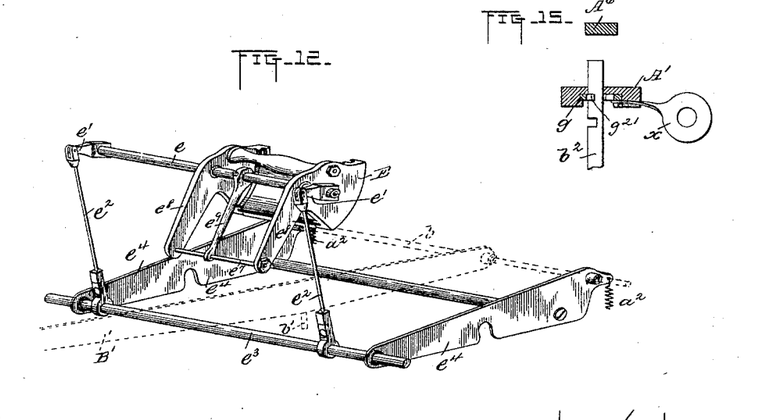
Fig. 12 is a perspective view of the mechanism for rocking or oscillating the type-carrier to raise or lower the type.
Figs. 14 and 15 are detail sectional views of the said stopping-slide in connection with the stopping-fingers.

E is the type-carrier, mounted on the rock-shaft $e$, supported on center screws $a^5$, tapped through depending lugs $a^6$ at the rear of the frame A. The said type-carrier oscillates with the said shaft and has a lengthwise-sliding movement thereon, so as to bring any one of the type of the said carrier into printing position to be struck by the impression-hammer F. The rock-shaft $e$ is provided with arms $e'$, Fig. 12, connected by links $e^2$ with a rod $e^3$, carried by levers $e^4$, pivoted on the rod $b$, said levers being connected with the bracket or frame $a$ by the lifting-springs $a^2$. When the rod $e^3$ is depressed by means of a lug $b'$ on any one of the levers B', the type-carrier will be rocked or oscillated a suitable distance to raise the desired line of letters into printing position.

Figure 7:
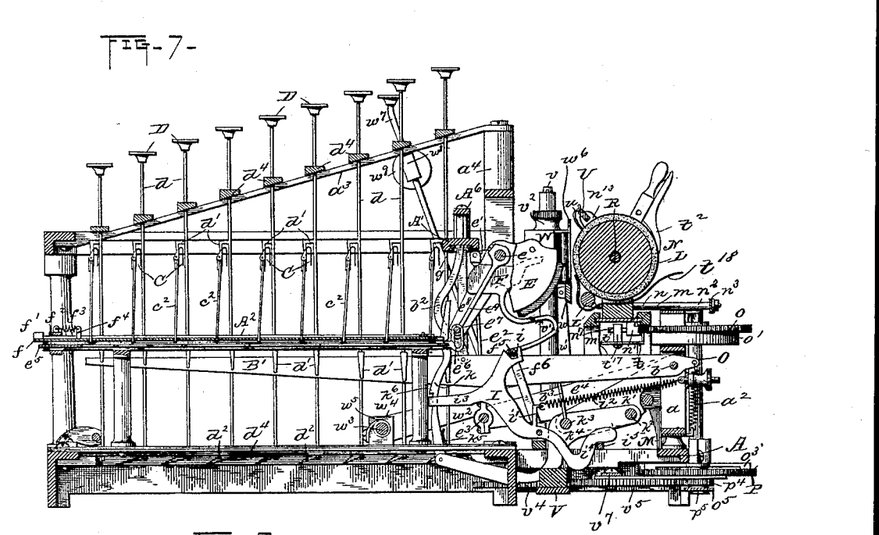
Fig. 7 is a central transverse sectional view of the machine with some parts in elevation.
Figure 8:
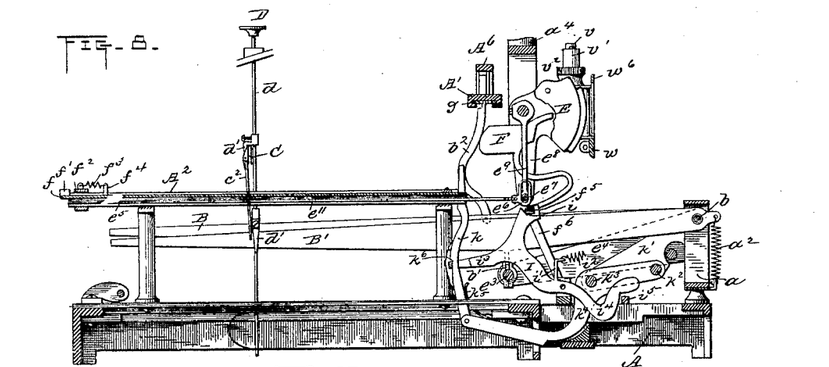
Fig. 8 is a similar view with some parts omitted to show others more clearly.
Figure 9:
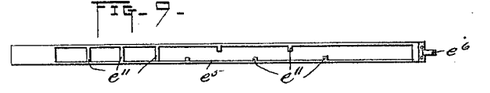
Figs. 9 and 10 are detail views of the transverse stopping and trigger slides.
Figure 10:
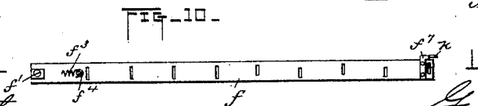
Figure 11:
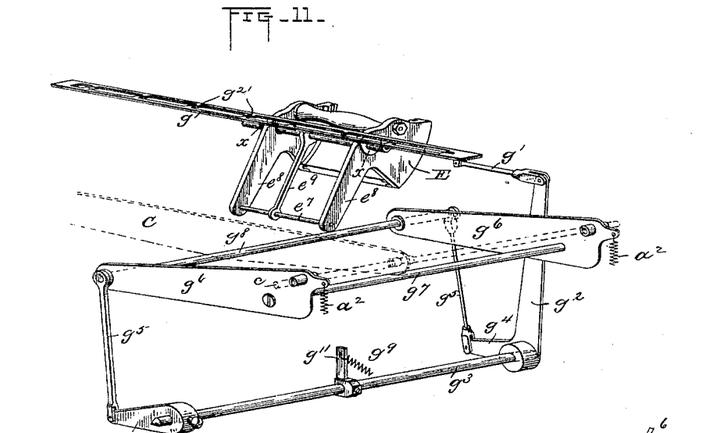
Fig. 11 is a perspective view of the mechanism for imparting longitudinal or sliding movements to the type-carrier.
Figure 13:
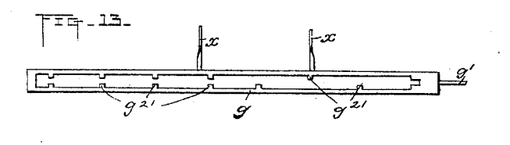
Fig. 13 is a detail plan view of the longitudinal stopping-slide.
Figure 14:
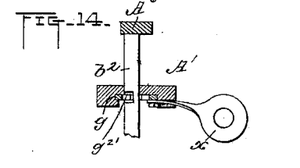

The type-carrier is connected with a slide $g$, Figs. 11 and 13, movable lengthwise in ways in the bar or guide A', Figs. 7 and 8, said slide being connected by a link $g'$ with an upright arm $g^2$ of a rock-shaft $g^3$, having the horizontal arms $g^4$ connected by links $g^5$ with the levers $g^6$, pivoted on the bar $c$ in the depending bracket or frame $a'$. The connection between the slide $g$ and the type-carrier is made by two ears $x$, attached to said slide and arranged one at each end of the type-carrier, said ears embracing the rock-shafts on which said type-carrier slides. The levers $g^6$ are connected together by rods $g^7$ and $g^8$ and are attached to lifting-springs $a^2$. The action of these lifting-springs may be supplemented by the adjustable spring $g^9$, attached to the arm $g^{11}$ of the rock-shaft $g^3$.

Figures 1, 33, 34:
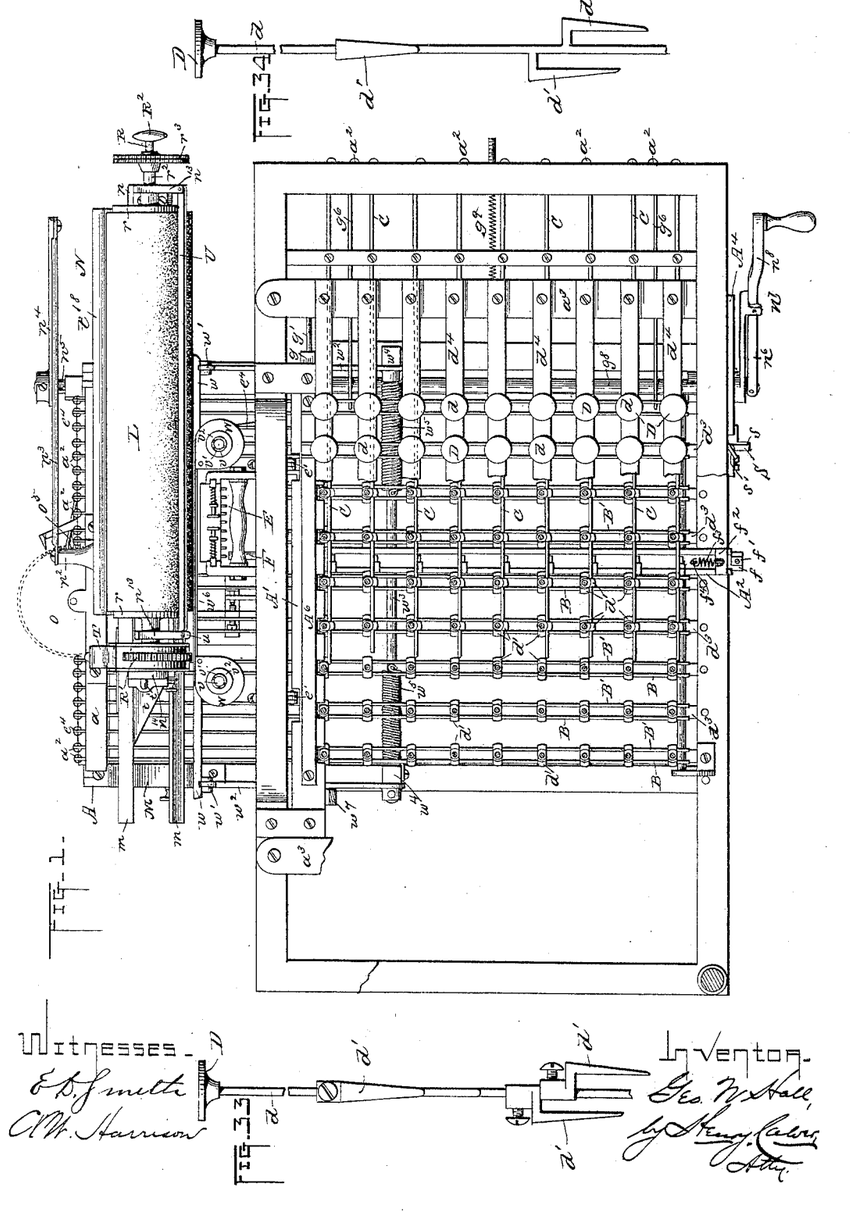
Figure 1 is a plan view (with parts broken away to show underlying parts) of my improved type-writer.
Figs. 33 and 34 are detail views of the sliding operating-keys.

The rod $g^8$ (near the free end of the long arms of the levers $g^6$) is so placed as to be struck by all of the longitudinal operating-levers C, so that when any one of the said levers is depressed the shaft $g^3$ will be rocked, thereby imparting a sliding or longitudinal movement to the type-carrier, the distance which the said type-carrier is moved being in proportion to the amount of movement of that one of the longitudinal operating-levers depressed. As the vertically-sliding keys $d$ are at different distances from the pivotal points or fulcra of the operating-levers B' and C, it will be obvious that uniform vertical movements of the said keys will impart variable movements to the said levers, and the oscillating and sliding movements of the type-carrier will therefore be different when different keys are depressed, so that the proper movements of the said type-carrier to bring any one of its type in printing position in front of the impression-hammer are thus provided for. The movements may be further varied or regulated by so locating the wings $d'$ on the keys $d$ as to have more or less lost motion between said wings and the operating-levers which they engage; and to secure the proper location of these keys they may, if desired, be made separate from said keys, as shown in Fig. 33, so as to be vertically adjustable thereon. These wings are, however, preferably formed integral with the keys, as shown in Fig. 34.

As above described, the type-carrier is connected with or attached to the slide $g$, and the said slide is provided with a series of projections or stops $g^{21}$, Figs. 11 and 13, to engage with fingers $b^2$, projecting upward from the transverse operating-levers B' through the opening in said slide, said fingers being provided with notches or narrow portions at their parts which normally come in the path of movement of the said slide, so that the travel of the latter will be uninterrupted until a stop comes in contact with a finger which has been depressed to bring its wider or stopping part in the range of a particular stop. The stops will of course be so located relative to the stopping-fingers that any desired length of movement of the slide can be effected before its travel is arrested, and thus all of the necessary different lengthwise positions of the type-carrier will be provided for. The fingers $b^2$ strike the stop-bar $A^6$ to arrest the upward movements of the levers B'.

At about the center of the machine is a transverse bar or guide $A^2$, which receives the hammer-releasing or trigger-operating slide $f$ and the transverse stopping-slide $e^5$, the latter having a loop $e^6$ at its rear or inner end, embracing the rod $e^7$, which connects the arms $e^8$ of the type-carrier. Between the said arms of the type-carrier is the arm $e^9$, rigidly secured to the rock-shaft $e$ and thus moving therewith. The rod $e^7$ passes loosely through a hole in the outer end of the arm $e^9$ to permit the type-carrier to slide freely back and forth on its supporting rock-shaft and relative to the said arm, and the latter, being rigidly attached to the said rock-shaft and being connected with the type-carrier through the said rod $e^7$, causes the said type-carrier to oscillate with the shaft $e$ when the latter is rocked by the mechanism shown in Fig. 12 and hereinbefore described.

The stopping-slide $e^5$ has a central slot or opening and a series of inwardly-projecting stops $e^{11}$ similar to those of the slide $g$. The longitudinal operating-levers C are provided with depending stopping-fingers $c^2$, the lower ends of which, when the said levers are in their normal or raised positions, are above the said stopping-slide, as shown in Fig. 7. The fingers $c^2$ are normally entered into slots in the trigger-slide $f$ and are hinged so that they can swing to accommodate the short reciprocating movements of the said slide $f$, the latter being provided at its front end with a projection or block $f'$, of suitable length to engage a cross-bar $f^2$ on the guide-bar $A^2$.

When any one of the levers C is depressed, the stopping-finger $c^2$ carried thereby will be forced downward through its slot in the trigger-slide $f$ and the opening in the stopping-slide $e^5$, so as to be in the path of movement of some one of the stops on the said stopping-slide. When the proper stop strikes the depressed stopping-finger, the movement of the said stopping-slide $e^5$ will be imparted to the trigger-slide $f$ until the block $f'$ on the latter strikes the cross-bar $f^2$, when the further movement of both slides will be arrested. As the said stopping-slide $e^5$ is connected with the rod $e^7$ of the type-carrier by means of the loop $e^6$ the oscillating movement of the said type-carrier will likewise be stopped, with the proper letter in printing position, in front of the impression-hammer.

The trigger-slide is retracted by the spring $f^3$, attached to a pin or projection $f^4$ on said slide and to the cross-bar $f^2$ or a projection on said bar.

The type $h$ are secured in a segmental type-holder H, provided at its end with curved ribs $h'$, fitting in curved grooves in the type-carrier E, the said holder being secured in the carrier by the spring-pressed latches $h^2$, the ends of which enter holes in the said carrier. By withdrawing the said latches from the said holes the holder will be free to be removed from the carrier and may be replaced by another similar type-holder with different type.

The types $h$ are arranged to be driven against the impression-cylinder L by the hammer F and are surrounded by retracting-springs $h^3$, arranged between the inner and outer plates of the type-holder.

The impression-hammer F is carried by an arm $f^6$, pivoted at its lower end. I is the hammer-operating lever, the fulcrum of which is in alinement with the pivot of the hammer-arm, the said lever having a notch $i$, loosely embracing a cross-bar $f^5$ on the hammer-arm. The lever I has an upwardly-extending arm $i'$, to which is attached the impression-spring $i^2$, and the said lever has a forwardly-extending looped trigger-engaging arm $i^3$, surrounding the trigger $k$, (to be referred to presently,) and a rearwardly-extending arm $i^4$ to engage a stop $i^5$, and thus limit the movement of the said lever when acted on by the spring $i^2$.

The lever I is operated to draw back the hammer from the transverse operating-levers B through an actuating-frame consisting of the two arms $k'$, pivoted on the rod $b$ and rigidly connected together by the rods $k^2$ $k^3$, the latter rod being engaged by projections or lugs $b^3$, extending downward from the said levers B. Attached to the said rods $k^2$ $k^3$ is a rigid arm $k^4$, to the forward end of which is pivoted the trigger $k$, normally pressed forward in the looped arm $i^3$ of the lever I by a spring $k^5$, the said trigger being notched to form a hook or shoulder $k^6$ to engage the said arm $i^3$. Thus when one of the levers B is depressed and a lug or projection $b^3$ strikes the rod $k^3$ the arm $k^4$ will be forced downward, causing the hook or shoulder of the trigger $k$ to engage the arm $i^3$ of the lever I, and as the cross-bar $f^5$ of the hammer-arm $f^6$ is received in the notch $i$ of the said lever I the latter will be drawn forward, and thus retract the hammer F in readiness for a blow. The trigger-slide $f$ is provided at its rear end with a projection $f^7$, which when the said slide is operated from the stopping-slide $e^5$, as above described, will engage the trigger $k$, forcing the latter rearward against the pressure of the spring $k^5$ to disengage the hook or shoulder $k^6$ from the arm $i^3$ of the lever I, thus leaving the latter free to be forced rearward by the spring $i^2$, carrying with it the hammer-arm and hammer, the latter striking the type which is in printing position before it and thereby making the desired impression.

M is the carriage-supporting frame attached to the rear side of the frame A and having guideways $m$, in which the base-plate $n$ of the carriage N slides. The carriage N is provided with a rack $n'$, with which meshes a gear-wheel $o$ on the feed-shaft O, the volute carriage-actuating spring J being housed in a box $o'$ on the under side of the wheel $o$, said spring being attached to the shaft O and to a pin $o^2$, fixed to the frame or bracket $a$. Secured to the shaft O near its lower end is a pawl or engagement-bar $o^3$, having an inclined lower face, so as to be adapted to ride over the teeth on the upper face of the escape-wheel P, mounted loosely on said shaft, when the carriage is run backward, but to engage said teeth and thus connect the said wheel with the said shaft when the carriage is to be fed forward. The escape-wheel is pressed upward against the said pawl or engagement-bar by a spring $o^4$, attached to a lever $o^5$, which holds the said wheel on the lower end of the said shaft O, said spring yielding somewhat when the carriage is run backward to allow the escape-wheel to be depressed slightly, and thus permit the inclined lower face of the pawl or bar $o^3$ to ride over the teeth of said wheel, as above stated, said spring holding said wheel up in engagement with the said pawl or bar when the carriage is traveling forward.

The escapement lever or anchor $p'$ has an arm $p^2$, which is engaged by an arm or projection $k^7$ on one of the arms or levers $k'$ of the hammer-operating frame, so that at each movement of the said frame the said escapement-lever is moved to permit a tooth of said wheel to pass the pallets of the escapement-lever in the usual manner. A retracting-spring $p^3$ is attached to the said arm $p^2$ to effect the return movements of the escapement-lever.

The carriage N is provided with an arm $n^2$, to which is attached a link $n^3$, jointed to an arm $n^4$, attached to the carriage-returning shaft $n^5$, extending through the machine and having at its front end an arm $n^6$, to which is pivoted at $n^7$ the operating-handle $n^8$. The shaft $n^5$ is hollow, and a rod $n^9$ passes through it, the operating-handle $n^8$ being jointed to the front end of said rod. The said rod $n^9$ is provided with a pin $n^{11}$, extending outward through a slot in the hollow shaft $n^5$ to engage a slide Q, having an inclined rib $q$, which is received in a slot in the rear end of the lever $o^5$. The slide Q is movable on the said shaft $n^5$ and is pressed outward against the pin $n^{11}$ by a spiral spring $n^{12}$, arranged between the said slide and a collar $n^{13}$, attached to said shaft.

To the lower face of the escape-wheel P is attached a ribbon-feeding pinion $p^4$, and below the said pinion and rigidly connected therewith and thus with the said wheel is a hub $p^5$, having a groove which receives the front end of the lever $o^5$, so that the latter can, when desired, force the escape-wheel connected with said hub downward to entirely disengage the said wheel from the pawl or bar $o^3$, the spring $o^4$ having but a limited throw, so that when the forward end of the lever $o^5$ is depressed it will not prevent the escape-wheel from being disengaged from the said pawl or bar.

Figure 17:
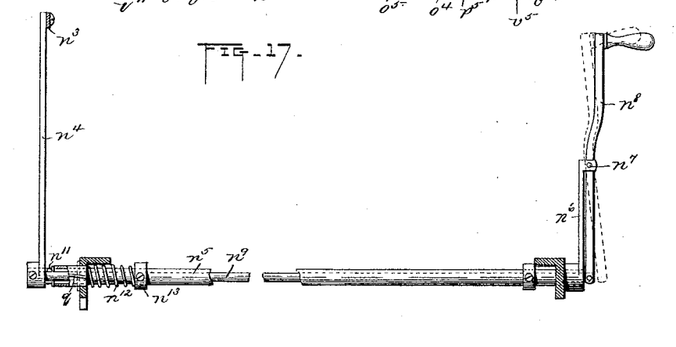
Fig. 17 is a detail view of the carriage-return mechanism.
Figure 18:
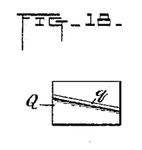
Fig. 18, a detail view of a part of the same.
Figure 19:
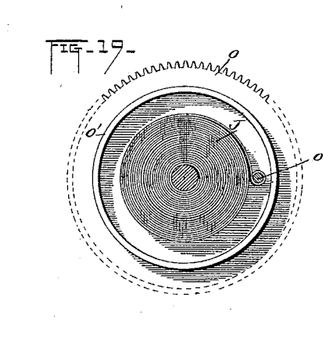
Fig. 19 is an under side view of the carriage-feeding gear-wheel and its feeding-spring.

Thus if it be desired to run the carriage N forward for some little distance without feeding it slowly forward by moving a space-bar or a carriage-operating key the operator forces in the upper end of the handle $n^8$, as shown in dotted lines, Fig. 17, thus drawing the slide Q, connected with said handle, forward or inward and causing the inclined rib $q$ thereon, and which is in engagement with the rear end of the lever $o^5$, to depress the forward end of said lever and thus lower the escape-wheel out of engagement with the pawl $o^3$, thereby disconnecting the said wheel from the feed-shaft, so that the carriage will be free to be moved forward as far as may be desired by turning the carriage-returning shaft $n^5$ by the handle $n^8$, and when the said handle is returned to its normal position (shown in full lines, Fig. 17) the connection between the feed-shaft O and the escape-wheel will be restored.

The movement of the carriage in either direction may be limited by stops S, attached to a segment $A^4$ on the frame A and having projections $s$, arranged in the path of movement of the arm $n^6$ of the shaft $n^5$, and either or both of said stops may be adjusted on said segment by being attached thereto by set-screws $s'$.

The impression-cylinder L is mounted on the carriage N. To the ends of said cylinder are attached the heads $r$, the hubs of which are tightly fitted on the sleeves $r'$ $r^2$, the latter being rigid with the milled button or finger-wheel $r^3$, said sleeves having bearings in the uprights $n^{13}$ of the carriage N.

R is a rod or shaft fitted to slide endwise through the sleeves $r'$ $r^2$, and R' is a toothed feeding or ratchet wheel by which the cylinder is normally to be rotated to advance the paper when the carriage is returned for a new line. The wheel R' is loosely fitted on the sleeve $r'$, so that the impression-cylinder with which said sleeve is rigidly connected may be turned backward, when desired, without rotating the said wheel. This detachable connection between the toothed feeding-wheel for the impression-cylinder and the said cylinder is one of the important novel features of my machine and is provided for in the present instance by forming the said wheel hollow and providing it with a head or disk $r^4$, carrying a clutching device consisting of the arms or levers $r^5$, jointed together at their inner ends by a pin $r^6$ and carrying the clutching-segments $r^7$ at their outer ends, said arms forming a toggle-joint. The pin $r^6$ passes through the rod or shaft R, and the inner ends of the toggle-levers $r^5$ are received in a slot $r^8$ in said shaft, said levers being connected to the disk $r^4$ by the loops or brackets $r^9$.

Figure 5:
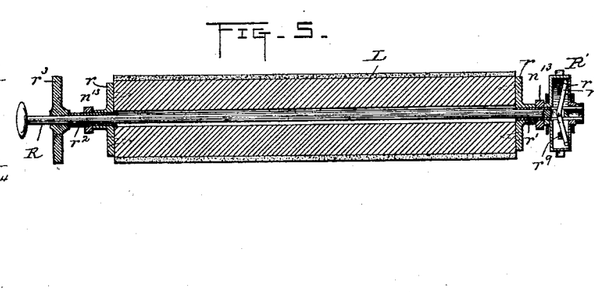
Fig. 5 is a longitudinal section of the impression-cylinder and adjacent parts.
Figure 6:
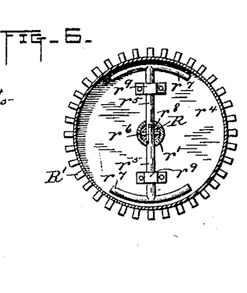
Fig. 6 is a detail view showing the clutch connecting the impression-cylinder shaft with its operating ratchet or feed wheel.
Figure 6A:
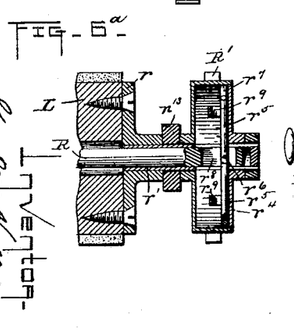

When it is desired to disconnect the impression-cylinder from the feeding-wheel to permit said cylinder to be turned backward, the rod or shaft R is pulled outward by its head or button $R^2$, as in Fig. 5, thereby removing the segments $r^7$ from the inner face of the rim of the wheel R', as clearly shown in Fig. 6; but when the said cylinder is to be connected with the said wheel the said rod or shaft is pushed in, and the toggle-levers will then be straightened, as in Fig. 6$^a$, forcing the segments $r^7$ into clutching contact with the rim of the feeding-wheel.

Figure 3:
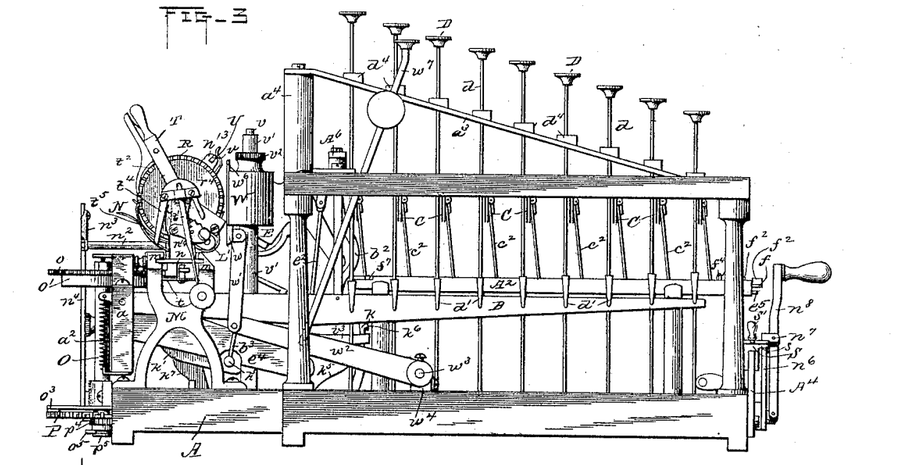
Figure 4:
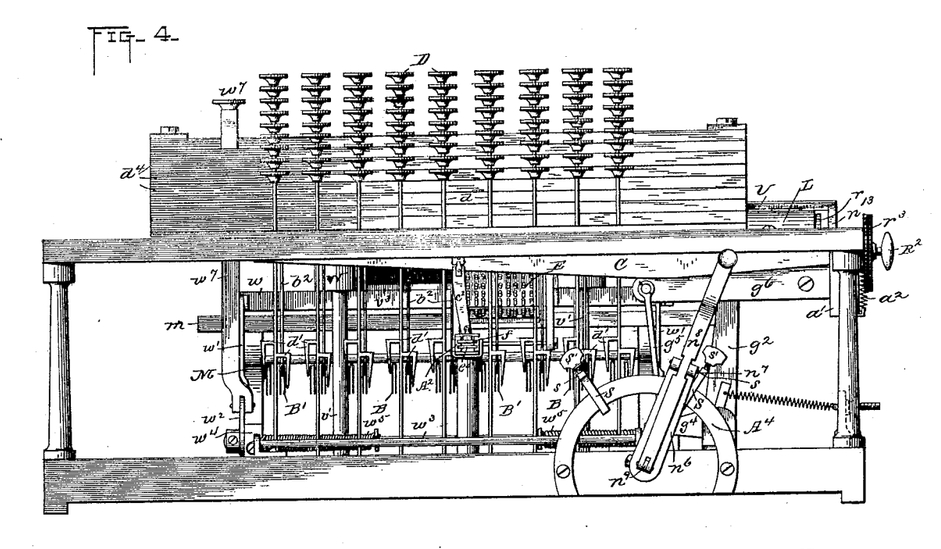
Fig. 4 is a front elevation of the machine.

The impression-cylinder is automatically rotated to advance the paper when the carriage is returned for a new line by means of the inclined plate $t$, Figs. 1 and 3, placed below the guideways $m$ of the carriage-supporting frame M and in the path of the rigid depending arm $t'$ of the pawl-carrier T, said pawl-carrier being provided with a pivoted spring-pressed feeding-pawl $t^2$. Thus when the carriage is moved back by the operator the arm $t'$ will engage the inclined plate $t$, swinging the top of the pawl-carrier to the left, Fig. 3, causing the pawl $t^2$ to give the desired amount of rotation to the toothed feeding-wheel R' to advance the paper held between the impression-cylinder and the feeding-roll L' beneath said cylinder. As the carriage moves forward when a line is being written the arm $t'$ rides down the incline of the plate $t$, thus permitting the pawl-carrier to swing back to its starting position under the stress of the spring $t^3$, pressing against the arm $t^4$ of the said carrier, the pawl riding idly back over the teeth of the feeding-wheel, and the rotation of the latter being prevented by the detent $t^5$.

Figure 16:
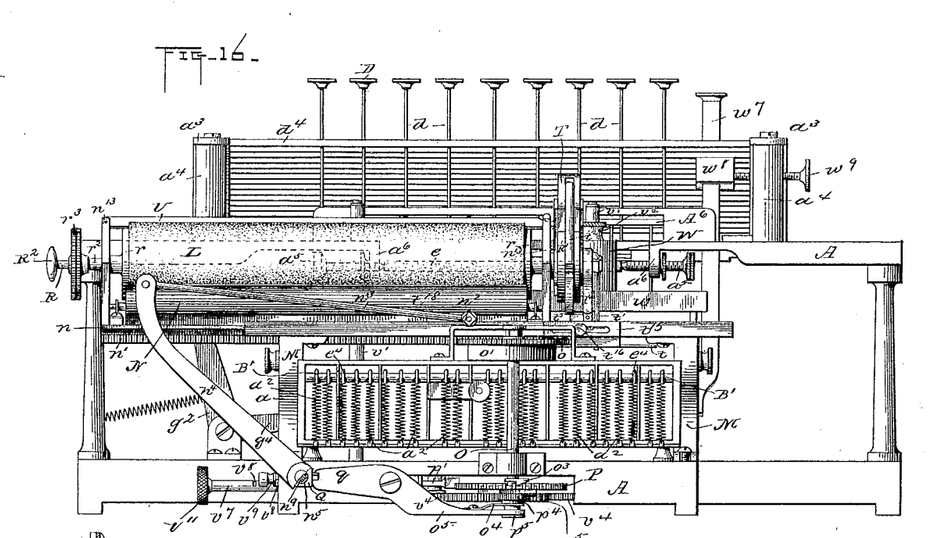
Fig. 16 is a rear elevation of the machine.

The pawl-carrier, operated by the incline $t$, always swings forward to the same position, and the amount of the feeding rotary movement to space the lines which will be given to the impression-cylinder will therefore be determined by the backward throw of the said pawl-carrier under the stress of the spring $t^3$. This backward throw of the pawl-carrier is regulated by an adjustable stop consisting in the present instance of a plate $t^6$, pivotally attached by a screw $t^7$ to the standard $n^{14}$, which supports the pawl-carrier and which is attached to the carriage N. This pivoted stopping-plate, as herein shown, is provided with three holes $t^8$, and it may thus be adjusted to three different positions by moving the said plate so that any one of the said holes is entered by the holding-pin $t^9$ in the standard $n^{14}$. The said plate $t^6$ is of thin spring metal and is thus adapted to be sprung into and out of engagement with the said pin and is provided with an operating-knob $t^{12}$ and with two steps or notches $t^{13}$. The pawl-carrier T is provided with a depending stopping-arm $t^{14}$ to engage either of the said steps or notches, or if the said plate be depressed to its lowest position said arm will be stopped by contact with the side of said standard $n^{14}$, thus allowing the pawl-carrier to have its full backward throw to give the longest feed to the impression-cylinder and thus space the lines most widely. The inclined plate $t$ is provided with an upturned slotted lip $t^{15}$, Fig. 16, by which the said plate is adjustably secured to one of the carriage-ways $m$ by a set-screw $t^{16}$. Thus if short lines are being printed and the carriage is not to be moved to the end of its backward throw the said incline plate will be adjusted forward the proper distance to secure the automatic feeding of the paper.

To prevent the carriage N from moving forward beyond a certain position, it may be stopped by means of a stopping-block $t^{17}$ on the incline plate $t$, said plate being in the path of movement of a pin $n^{17}$ on the rack-bar of the carriage.

Above the impression-cylinder and slightly separated therefrom is a paper-holding bar U, pivoted at one end to one of the standards $n^{13}$ and entering a slot in the upper end of the other of said standards, where it is removably retained by a spring-catch $u$. The printed sheet is intended to run under the said holding-bar, which may be released from its spring-catch at its free end and raised on its pivot, so as to be brought down over the sheet should the latter fail to run under it properly.

Figures 20, 21, 22, 23, 24:
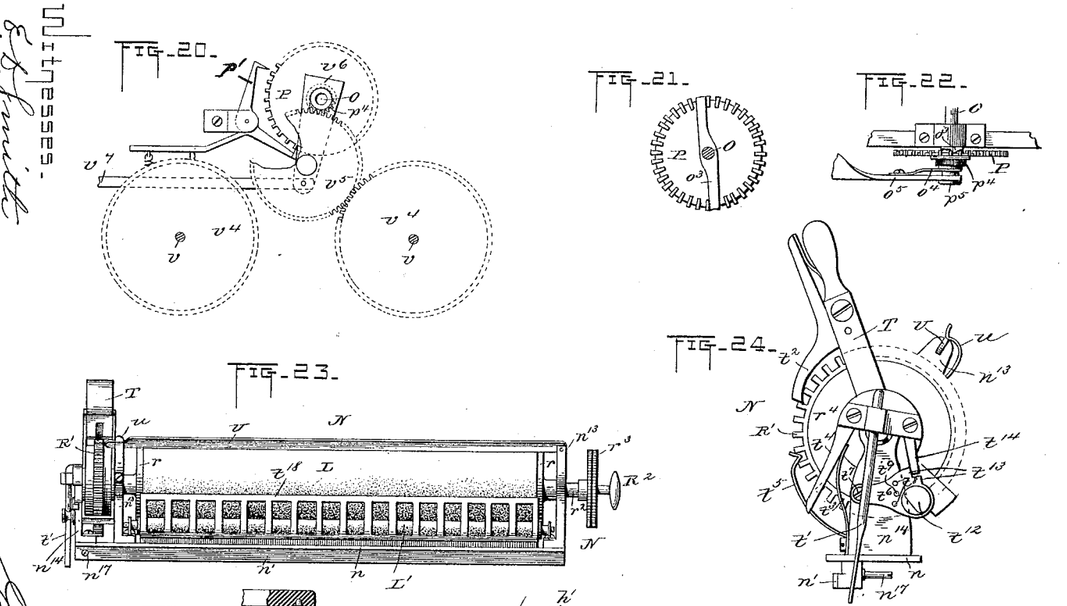
Fig. 20 is a detail view illustrating the escape-wheel and escapement-lever and the relation of these parts to the gear-wheels of the ribbon-feeding shafts.
Fig. 21 is a detail plan view of the escape-wheel and its pawl.
Fig. 22 is a detail elevation of the escape-wheel and pawl and the means for depressing said wheel to disengage it from its pawl.
Fig. 23 is a front elevation of the impression-cylinder, showing also the feed-roll and the reticulated paper-guide.
Fig. 24 is a left-hand end view of the parts shown in Fig. 23 to illustrate the toothed feed-wheel for the impression-cylinder and the pawl mechanism for the same.
Figure 25:
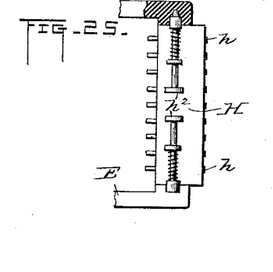
Figs. 25, 26, and 27 are detail views illustrating the type-carrier and type-holder.
Figure 26:
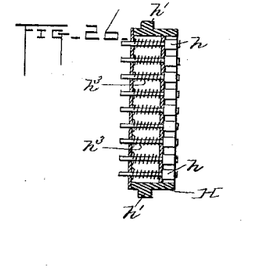
Figure 27:
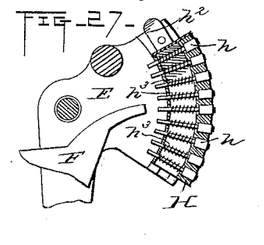
Figure 28:
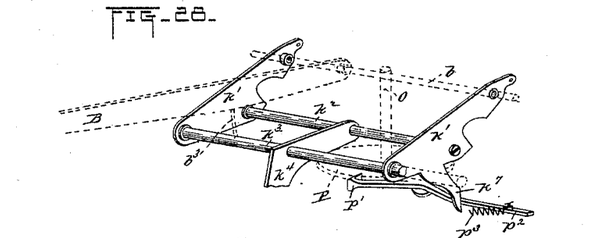
Fig. 28 is a detail perspective view of the hammer-operating frame, showing also the escape-lever actuated thereby.
Figure 29:
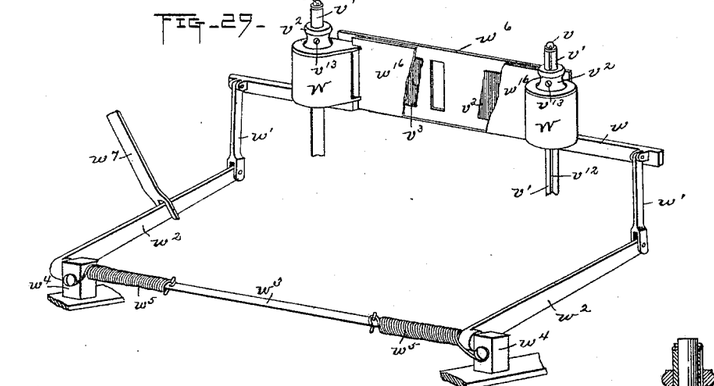
Fig. 29 is a detail perspective view of the ribbon carrying and shielding devices and means for raising and lowering the same.
Figures 30, 32, 35:
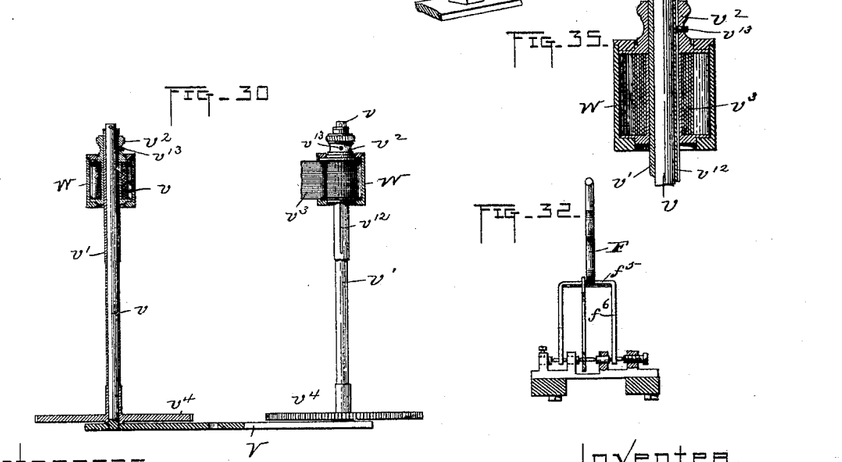
Fig. 30 is a vertical sectional view of the ribbon mechanism.
Fig. 32 is a detail elevation of the hammer-carrying arm and hammer.
Fig. 35 is an enlarged detail sectional view of one of the ribbon-carrying spools and spool-cases and adjacent parts.
Figure 31:
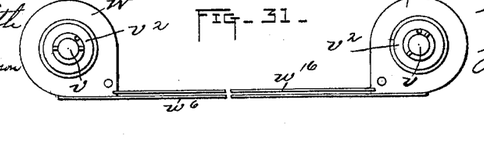
Fig. 31 is a plan view of part of the ribbon devices.

Beneath the impression-cylinder and the feed-roller L′ is the curved paper-guide $t^{18}$, the upturned inner end or lip of which is provided with openings, Fig. 23, on the front side of said cylinder, through which the paper may be seen, so that the operator can determine by casual observation when the end or bottom of a page or sheet of paper is approaching. The inner upturned end of the said paper-guide (which is of spring metal) presses against the impression-cylinder, and this causes sufficient friction to enable the said cylinder to feed the paper after the end of the latter has passed upward beyond the friction of the feed-roller L′.

As the carriage-supporting frame is unobstructed at its ends, the carriage may have any desired length of travel thereon, so that interchangeable impression-cylinders of different lengths may be employed, if desired, and thus the machine may be used for printing long lines on wide paper.

Figure 2:
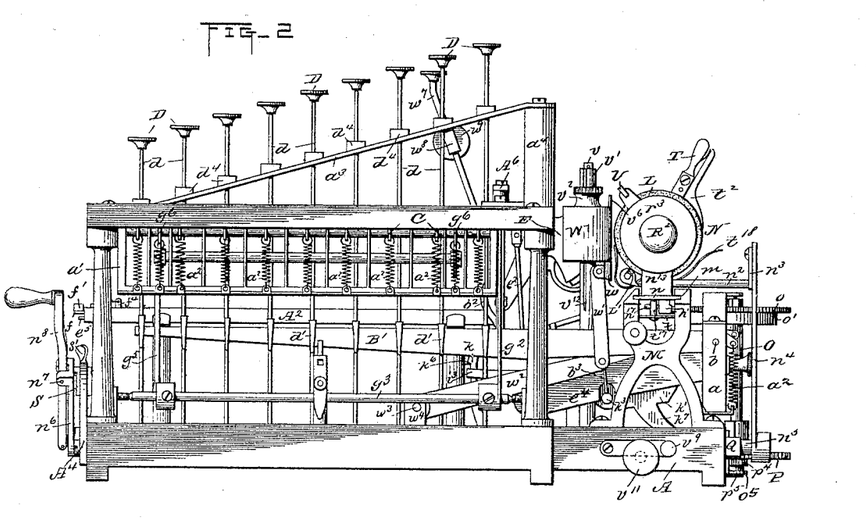
Figs. 2 and 3 are opposite end views thereof.

Secured to the bottom of the frame A is a bar V, to which are fixed two rods $v$, on which are journaled the hollow shafts $v'$, which rotate the spools $v^2$, on which is wound the ink-ribbon $v^3$. The shafts $v'$ are provided at their lower ends with gear-wheels $v^4$, rotated by a gear-wheel $v^5$, meshing with the ribbon-feeding pinion $p^4$, rotating with the escape-wheel P, the said gear-wheel $v^5$ being carried by a swinging arm or lever $v^6$, to which is attached a rod $v^7$, by which the said arm $v^6$ may be moved to cause the gear-wheel $v^5$ to engage either of the gear-wheels $v^4$ and thus positively rotate either of the ribbon-shafts $v'$. The rod $v^7$ is provided with two notches $v^8$ to receive a latch $v^9$, Figs. 2 and 16, which will hold the rod in position to retain the gear-wheel $v^5$ in engagement with either of the gear-wheels $v^4$, said rod having at its outer end a head or knob $v^{11}$, by which it may be conveniently operated.

The ribbon-spools $v^2$ are connected with the shafts $v'$ to rotate therewith, but are adapted to slide up and down on the said shafts. This sliding connection is herein shown as being effected by providing the said shafts with grooves $v^{12}$, entered by the points of screws $v^{13}$, passing through the hubs of the spools, but may, if desired, be any ordinary spline-and-groove connection. The ribbon-spools are surrounded by cases W, attached to a cross-bar $w$, supported by links $w'$, attached to the outer ends of arms $w^2$, fixed to a shaft $w^3$, journaled in blocks $w^4$ at the base of the machine, said shaft being provided with torsional springs $w^5$ of sufficient strength to hold the spool-cases W elevated. In front of the ribbon, or between the latter and the impression-cylinder, is a shield or plate $w^6$, attached to the bar $w$ or to the spool-cases, or both, said plate having an opening through which the type can print. If desired, a second plate $w^{16}$, similar to the plate $w^6$, but on the opposite or type-carrier side of the ribbon, may be provided, thus shielding the ribbon between two plates. To one of the arms $w^2$ is attached an operating or depressing arm $w^7$, to which latter is attached an adjustable stop or block $w^8$, secured to said arm by a set-screw $w^9$. The said stop or block is forced upward against the under side of one of the bars $d^4$ by the torsional springs $w^5$, which hold up the spool-cases and connected parts, as well as the ribbon-spools and ribbon. Thus by adjusting the said stop or block up and down on the arm $w^7$ it will be apparent that the ribbon (held edgewise vertically between the type-carrier and impression-cylinder) will be sustained at different heights, so that different crosswise parts of said ribbon will pass in front of the type to utilize the whole width of the ribbon.

As the type are arranged to print against the front side of the impression-cylinder the printed matter is in view of the operator, excepting such part thereof as will be hidden by the ribbon-spool cases and ribbon and the plates $w^6$ $w^{16}$, and to enable the operator to see the last line or letter printed it is only necessary for him to depress the arm $w^7$ and thereby lower the said plates, the ribbon, and the ribbon-spool cases out of the way. As soon as the operator takes his finger off the button at the upper end of the said arm $w^7$ the torsional springs $w^5$, surrounding the shaft $w^3$, will return the parts to their normal positions.

From the foregoing it will be apparent that the intermittingly-rotating pinion $p^4$, connected with the escape-wheel, will impart a proper feeding movement to one or the other of the ribbon-spools to wind the ink-ribbon thereon, and when the said ribbon has all been wound on one spool the rod $v^7$ can be adjusted by the operator to disengage the gear-wheel $v^5$ from that one of the gear-wheels $v^4$ with which it has been in contact and engage it with the other of the said gear-wheels $v^4$ to reverse the movement of the ribbon and wind it on the other spool.

The general operation of my machine is as follows: When the type-carrier is in its normal position it is depressed, as shown in Fig. 7, so that the types of the top row are below the hammer and the latter can therefore move without impressing any of the types, and when the said carrier is in this normal position any one of the levers B may be operated to space the words by any suitable space bar or key, the said levers B actuating the carriage-feeding mechanism through the hammer mechanism, as has been hereinbefore described. To print with any of the types in the left-hand row of types in the carrier, the latter needs only to be lifted or oscillated upward to bring the desired type into printing position, no longitudinal movement of the type-carrier being necessary to bring the said types of the said left-hand row into printing position, but to bring any of the types excepting those of the said left-hand row into printing position both longitudinal and upward movements must be given to the carrier, the amount of these movements being in proportion to the distance which the particular type to be used is from the top and the left side of the carrier. The term "left" as herein used has reference to the position of the type-carrier in Fig. 1, or facing the operator. It will be apparent from the description of the connection of the operating-levers with the type-carrier contained in the early part of this specification that the transverse operating-levers B' will impart the upward or oscillating movement to the type-carrier and the levers C longitudinal movement thereto. As the keys $d$ by which these levers are actuated are at varying distances from the fulcra of the said levers, movements of different lengths may be given to said levers, and consequently to the type-carrier, by the uniformly-operating keys, as hereinbefore stated, the keys farthest from the fulcra of the levers of course imparting less movements to the type-carrier than the keys nearer the fulcra of the said levers.

The levers B' and C are arranged to cross each other, and when a key $d$ the wings of which engage both a lever B' and lever C is depressed simultaneous vertical or oscillating and longitudinal movements (or a diagonal movement, which is a resultant thereof) will be imparted to the type-carrier, these movements being limited by the engagement of the stops of the stopping-slides $g$ and $e^5$ (connected with said carrier) with the fingers $b^2$ and $c^2$ of the levers B' and C. The depression of a key $d$ will also operate one of the levers B, the projection $b^3$ on which will engage the rod $k^3$ of the hammer-actuating frame, and by depressing the rigid arm $k^4$ of said frame will cause the trigger $k$ to engage the looped arm $i^3$ of the lever I and draw back the said lever and the hammer-arm $f^4$, the cross-bar $f^5$ of the said arm being in the notch $i$ of the said lever, and when the type-carrier has arrived in printing position the projection $f^6$ of the trigger-slide $f$ (the latter being operated from the stopping-slide $e^5$, as hereinbefore described) will strike the said trigger and release it from the arm $i^3$, thus permitting the hammer-actuating spring $i^2$ to cause the hammer to strike the type which is in printing position before it and make the desired impression. In the meantime the arm $k^7$ on the lever $k'$ of the hammer-actuating frame has engaged and moved the escapement-lever, so that the carriage has been fed forward the proper distance for the next letter. It will therefore be understood that when it is necessary to impart both a longitudinal and an upward or oscillating movement to the type-carrier to bring a desired type into printing position (and this is the case with all of the types excepting those in the left-hand row of types in the carrier) a lever C and a lever B' must be operated, and in all instances a lever B must also be operated to actuate the hammer and the carriage-feeding mechanisms. As the carriage-feeding mechanism is operated through the hammer mechanism, of course the hammer operates idly when only a lever B is operated to space the words. When only an upward or oscillating movement is imparted to the type-carrier to print with a type in the left row of types therein, of course only one of the levers B' will be operated in addition to one of the levers B.

From the foregoing it will be apparent that by means of the two sets of type-carrier-operating levers, arranged crosswise of each other, the type-carrier may be moved in any desired direction in two planes or vertically and horizontally, but as these two movements are to occur simultaneously the real movement of the type-carrier will be the resultant of two forces, or a diagonal movement. It will of course be understood that the type-carrier may be arranged to slide up and down in a right line instead of rocking or oscillating up and down, if desired, and instead of sliding horizontally the type-carrier may rock or oscillate horizontally, the essential point being that it must be movable in two different planes, and whether these movements are rocking or sliding ones is immaterial so far as the principle involved is concerned.

In the machine shown by my patent hereinbefore referred to the type-carrier, movable in two different planes, was operated by two rocking bars or shafts, each having a set of fingers or levers, all of which moved together when one finger or lever was depressed by the key by which it was engaged; but in the present instance the levers of each set are all movable independently of each other.

Having thus described my invention, I claim and desire to secure by Letters Patent—

1. In a type-writing machine, the combination with a type-carrier adapted to move in two different planes, of two crossing sets of operating-levers connected with said carrier, suitable finger-keys for operating said levers, means carried by said operating-levers to limit and stop the movements of said type-carrier, and suitable mechanism coöperating with said stopping means to accomplish this result.

2. In a type-writing machine, the combination with a type-carrier movable in two different planes, of two crossing sets of operating-levers connected with said carrier and provided with stopping fingers or projections, two stopping-slides also connected with said carrier and having stops or projections to engage said fingers, and keys for actuating said operating-levers, substantially as set forth.

3. In a type-writing machine, the combination with a suitable supporting-frame and a type-carrier movable in two different planes, of a set of transverse operating-levers pivoted at the rear side of said frame and connected with said type-carrier to move the same vertically, a set of longitudinal operating-levers pivoted at one end of said frame and connected with said type-carrier to move the same longitudinally or horizontally, stopping fingers or projections on both sets of the said operating-levers, and stopping-slides connected with said carrier and adapted to engage said fingers and thereby limit the movement of the said carrier, substantially as set forth.

4. The combination with the frame A having the bracket $a$ at its rear side and the bracket $a'$ at one end, of the rod $b$ in said bracket $a$, the operating-levers B' pivoted on said rod, the rod $c$ in the said bracket $a'$, the operating-levers C pivoted on said rod $c$, the type-carrier E, the rock-shaft $e$ with which said type-carrier is connected to oscillate therewith and on which it can slide longitudinally, actuating-keys to engage said operating-levers, and connections, substantially as described, between said type-carrier and operating-levers, to move the type-carrier in any desired direction, as set forth.

5. The combination with the rock-shaft $e$ having the arms $e'$, of the type-carrier E connected with said shaft to rock therewith and adapted to slide longitudinally thereon, the links $e^2$, the rod $e^3$, the levers $e^4$ connected together by said rod, the levers B' having the lugs or projections $b'$ to engage the said rod, and thus operate the said levers $e^4$ and rock the type-carrier, substantially as set forth.

6. The combination with the rock-shaft $e$, of the type-carrier E connected with said shaft to rock therewith but adapted to slide longitudinally thereon, of the stopping-slide $g$ connected with said carrier, the link $g'$, the rock-shaft $g^3$ having the arms $g^2$ and $g^4$, the links $g^5$, the levers $g^6$, the cross-rod $g^8$ and the operating-levers C, substantially as set forth.

7. The combination with the type-carrier E, of the removable type-holder H having rib-and-groove connections with said carrier, and the spring-pressed locking-latches $h^2$ entering holes in the said carrier and thus removably securing said holder thereto, substantially as set forth.

8. In a type-writing machine, the combination with a type-carrier provided with a set of spring-retracted types, of an impression-hammer, an arm or lever by which said hammer is carried, a hammer-operating lever engaging the said hammer-carrying arm or lever and having a trigger-engaging arm, an impression-spring for moving the said hammer-operating lever in one direction, a pivoted frame having a rigid arm, a trigger pivoted to said arm, a trigger-slide for disengaging said trigger from the said trigger-arm, and keys and levers for operating said pivoted frame and trigger-slide, substantially as set forth.

9. In a type-writing machine, the combination with the type-carrier E and its spring-retracted types, of the hammer F, its carrying-arm $f^5$, the hammer-operating lever I having the notch $i$, to engage the said arm $f^5$, and the trigger-arm $i^3$, the impression-spring $i^2$, the pivoted actuating-frame consisting of the arms $k'$ and the rods $k^2$, $k^3$, the rigid arm $k^4$ carried by said rods, the trigger $k$ pivoted to said arm $k^4$, the spring $k^5$ for pressing said trigger forward, the trigger-slide $f$ to release said trigger from the said trigger-arm, a retracting-spring for said trigger-slide, the stopping-slide $e^5$ having a projection to engage said trigger-slide and the keys and levers for operating said stopping-slide, substantially as set forth.

10. In a type-writing machine, the combination with a type-carrier, operating-keys and levers therefor, and the stopping-slide $e^5$ connected with said carrier, of an impression-hammer and the trigger-slide $f$ operated from the said stopping-slide and connected with the hammer appliances to release the hammer when the said stopping-slide has moved a predetermined distance, substantially as set forth.

11. In a type-writing machine, the combination with an impression-cylinder mounted in bearings on the machine-frame, of a rotating shaft for driving said cylinder passing through said cylinder and longitudinally movable therein, a feeding drum-wheel carried by said cylinder, and a clutch connection between said shaft and drum-wheel, said clutch being carried and operated by said longitudinally-movable shaft and housed within said drum-wheel, substantially as described.

12. In a type-writing machine, the combination with the impression-cylinder L having the attached heads provided with tightly-fitting sleeves one of which has a button or finger-wheel, of a sliding rod adapted to be moved endwise through said sleeves, a feeding-wheel loose on one of said sleeves and a clutch arranged to be engaged and released by said sliding rod, for operatively connecting said wheel with the sleeve on which it is loosely mounted when desired; whereby the impression-cylinder is adapted to be rotated independently of said wheel or to be rotated by said wheel to feed the paper, at the will of the operator, substantially as set forth.

13. The combination with the impression-cylinder L having the attached heads $r$, of the sleeves $r'$ $r^2$ tightly fitting in the hubs of said heads, the sleeve $r^2$ being provided with the finger-wheel $r^3$, the sliding rod or shaft R fitted to be moved lengthwise through the said sleeves and having the head or button $R^2$, the toothed feeding-wheel $R'$ loosely mounted on the said sleeve $r'$, the disk $r^4$, the toggle arms or levers connected with said disk but arranged to be engaged at their inner ends by said shaft, and the clutching-segments $r^7$ carried by said toggle arms or levers, substantially as set forth.

14. In a type-writing machine, the combination with the carriage-supporting frame M, the carriage N and the impression-cylinder L mounted on the said carriage and provided with the toothed feeding-wheel $R'$, of the horizontal incline plate $t$ on the said frame and the pawl-carrier T provided with the rigid depending arm $t'$ and the spring-pressed pawl $t^2$, substantially as set forth.

15. The combination with the impression-cylinder, its toothed feeding-wheel, the pawl-carrier T having the stopping-arm $t^{14}$ rigidly mounted thereon, the spring $t^3$ and the spring-pressed pawl, of the pivoted and adjustable stopping-plate $t^6$ for limiting the backward throw of the said pawl-carrier, substantially as set forth.

16. In a type-writing machine, the combination with a type-carrier, an impression-hammer and a hammer-operating frame, of a carriage having a rack, a gear-wheel engaging said rack, a shaft on which said gear-wheel is mounted, a spring for operating said shaft to move the carriage forward, an escape-wheel also on said shaft, and an escapement-lever receiving movement from said hammer-operating frame; whereby, when the impression-hammer is actuated, the escapement mechanism will be operated to permit the carriage to be fed forward.

17. The combination with the carriage N provided with the rack $n'$, of the feed-shaft O having the gear-wheel $o$, the volute spring J connected to said shaft and serving to rotate the same, the pawl or bar $o^3$ attached to said shaft, the escape-wheel P loose on said shaft, the escapement-lever, and the arm by which said lever is operated, substantially as set forth.

18. The combination with the carriage N having an arm $n^2$, of the carriage-returning shaft $n^5$ having the arm $n^4$ and the link $n^3$ connecting the said arms $n^2$ and $n^4$, said shaft being provided at the front side of the machine with an operating-handle, substantially as set forth.

19. The combination with the carriage N, of the hollow carriage-returning shaft $n^5$ the rear end of which is connected with said carriage and the front end of which is provided with the arm $n^6$, the operating-handle $n^8$ pivoted to said arm, the rod $n^9$ connected to said handle and extending through said shaft, the slide Q operated by said rod and having the inclined rib $q$, the lever $o^5$ operated by said incline, and the escape-wheel to be lowered out of engagement with its pawl, to permit the said carriage to be moved freely forward when desired, substantially as set forth.

20. The combination with the carriage N, of the carriage-returning shaft the rear end of which is connected with said carriage and the forward end of which is provided with the arm $n^6$, of the segment $A^4$ having one or more adjustable stops S arranged in the path of movement of the said arm, substantially as set forth.

21. The combination with the shafts $v'$, of the ribbon-spools $v^2$ connected with said shafts to rotate therewith but adapted to slide lengthwise thereof, the spool-cases W, the cross-bar $w$ to which said cases are attached, the links $w'$, the shaft $w^3$ having the arms $w^2$, the torsional springs $w^5$, the depressing-arm $w^7$ and the adjustable stop on the latter, substantially as set forth.

22. In a type-writing machine, the combination with the impression-cylinder and the vertically-movable ribbon-spools, of a vertically-movable shield or plate interposed between said cylinder and the ink-ribbon running from one of said spools to the other, springs for holding said shield in an elevated position, an operating-handle which may be pressed upon to lower said shield, ribbon, and ribbon-spools from in front of the printed page when desired, and an adjustable stop on said operating-handle substantially as set forth.

23. The combination with the cross-bar $w$ and the spool-cases and the shield or plate $w^6$ supported by said bar, of the shaft $w^3$ connected with said bar, the torsional upholding-springs $w^5$, the depressing-arm $w^7$ and the adjustable stop on said arm, substantially as set forth.

24. The combination with the carriage N having the stopping-pin $n^{17}$, of the horizontally-adjustable incline plate $t$ having the stopping-block $t^{17}$, substantially as set forth.

In testimony whereof I affix my signature in presence of two witnesses.

GEORGE W. HALL.

Witnesses:
 HENRY CALVER,
 A. W. HARRISON.